(12) United States Patent
Burton et al.

(10) Patent No.: US 10,322,571 B2
(45) Date of Patent: Jun. 18, 2019

(54) LOADING TEMPLATE FOR LAMINATION CASSETTE

(71) Applicant: Giesecke & Devrient Mobile Security America, Inc., Dulles, VA (US)

(72) Inventors: Christopher William Burton, Stow, OH (US); Daniel William Hunt, Cleveland Heights, OH (US); David Edward Boelens, Canton, OH (US)

(73) Assignee: GIESECKE+DEVRIENT MOBILE SECURITY AMERICA, INC., Dulles, VA (US)

( * ) Notice: Subject to any disclaimer, the term of this patent is extended or adjusted under 35 U.S.C. 154(b) by 363 days.

(21) Appl. No.: 15/380,166

(22) Filed: Dec. 15, 2016

(65) Prior Publication Data

US 2018/0170029 A1    Jun. 21, 2018

(51) Int. Cl.
*B32B 38/18* (2006.01)
*B32B 37/00* (2006.01)

(52) U.S. Cl.
CPC .......... *B32B 38/18* (2013.01); *B32B 37/0046* (2013.01); *B32B 2425/00* (2013.01)

(58) Field of Classification Search
CPC ... B32B 37/0046; B32B 37/187; B32B 38/18; B32B 38/1825; B32B 38/1833
See application file for complete search history.

(56) References Cited

U.S. PATENT DOCUMENTS

| | | | |
|---|---|---|---|
| 3,483,060 A * | 12/1969 | Hu | B29C 65/18 100/315 |
| 4,199,391 A | 4/1980 | Andrews | |
| 5,332,463 A * | 7/1994 | Eberlein | B32B 38/1833 156/299 |
| 5,563,234 A | 10/1996 | Otto | |
| 5,762,752 A | 6/1998 | Sawano et al. | |
| 6,283,188 B1 | 9/2001 | Maynard et al. | |
| 6,491,775 B1 * | 12/2002 | Janssen | B29C 63/0004 156/108 |
| 6,514,587 B1 | 2/2003 | Fernandez-Kirchberger et al. | |
| 2004/0095546 A1 * | 5/2004 | Lee | G02F 1/1333 349/187 |

* cited by examiner

*Primary Examiner* — Philip C Tucker
*Assistant Examiner* — John Blades
(74) *Attorney, Agent, or Firm* — Drinker Biddle & Reath LLP

(57) ABSTRACT

A lamination cassette includes a substrate to accommodate a plurality of first sheets of a first size. A loading template is removably coupled to the cassette via an adapter on the cassette to secure the loading template when inclined for loading. The template includes a first loading section for accommodating a plurality of second sheets of a second size smaller than the first size when loaded onto the substrate. The lamination cassette is configured to support sheets of the first size when the adapter is not coupled to the substrate and the vertical support surface is configured to support sheets of the second size when the loading template is coupled to the substrate. The loading template may also include a second loading section for accommodating a plurality of third sheets having the same size as the second sheets for laminating two pluralities of same size sheets on a single cassette.

23 Claims, 7 Drawing Sheets

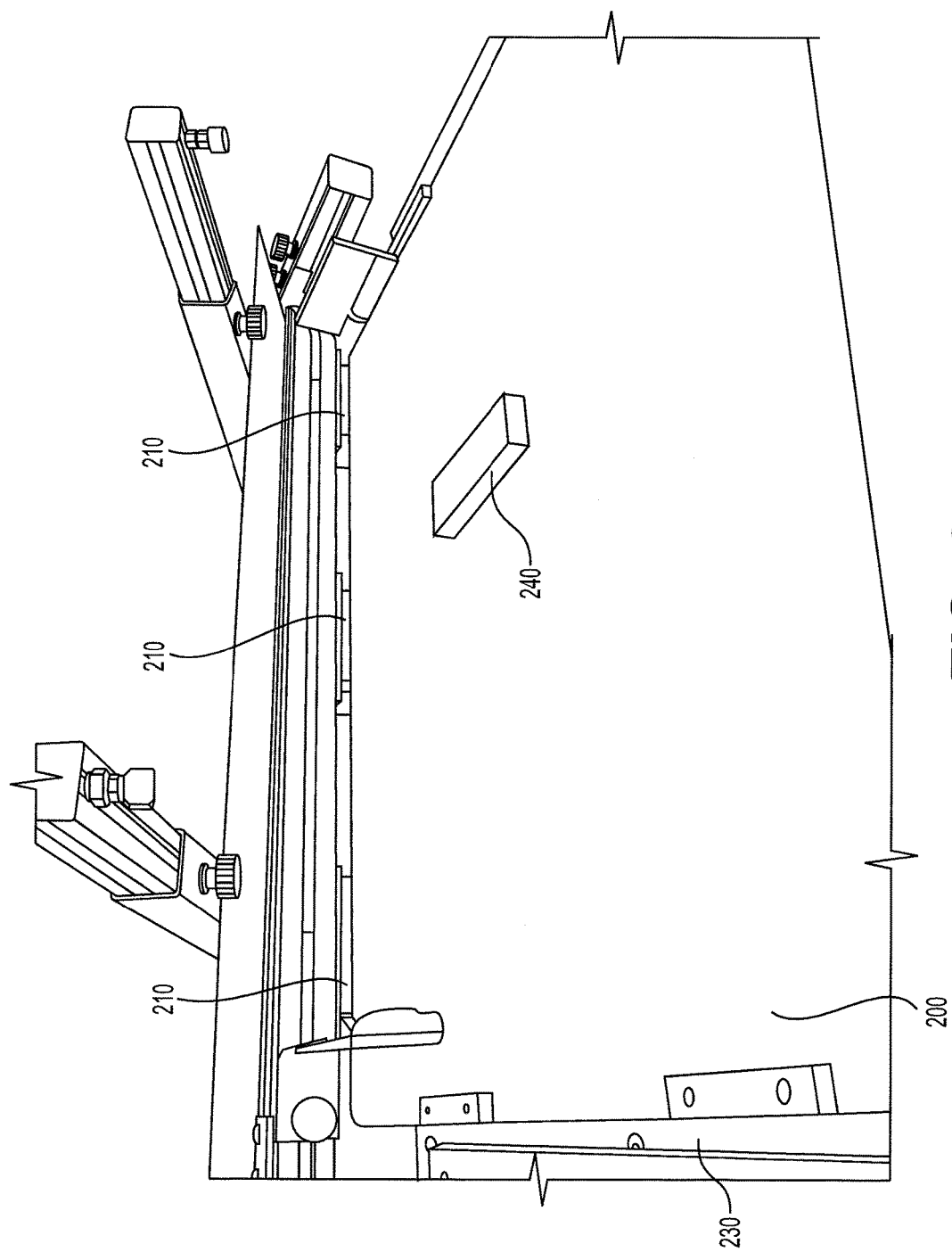

LOADING TEMPLATE FOR LAMINATION CASSETTE

TECHNICAL FIELD

The present disclosure relates generally to a template for a lamination cassette to facilitate the use of same-sized cassette with more than one size lamination sheet.

BACKGROUND

Currently, multilayer ID-1 format cards are formed from a number of layers of polymer to be used for a variety of applications, such as payment cards (i.e., credit or debit cards), identification cards, building access passes, or any other uses for an ID-1 format card. Standards for typical ID-1 format cards are established by ISO 7810. As shown in FIG. 1, a typical ID-1 format card 1 may comprise at least a core stock 10 made of polyvinyl chloride (PVC)), polycarbonate (PC), polyethylene terephthalate (PET), or other polymers sandwiched by a protective upper layer 11 and lower layer 12 formed of PVC or other polymer in thin sheet form. Core stock layer 10 typically includes opaque agents, translucent agents, or plasticizers mixed in and can be silk-screen printed, lithographically printed, digitally printed, and so forth to include desired graphics, such as a logo, color scheme, security features, or other identifying characteristics. Protective layers 11, 12 are often translucent so that the markings printed (such as printing 18) on the core stock layer can be seen. Magnetic stripe 15 may be added to a protective layer 11 or 12 prior to lamination for magnetic stripe transaction functionality. Other layers may also be included within the card, such as antenna or other materials for the specific application of the ID-1 format card 1. Layers 10, 11, 12 are laminated together by a combination of heat and pressure to for the completed card 1.

Mass production of cards requires that individual cards are cut out of large sheets laminated together. As shown in FIG. 2, a set of sheets comprising layers 10, 11, 12, are stacked together to form a sandwich 20. A number of sandwiches may be stacked together to form a book 30 that rests on top of the lamination cassette 100. Each sandwich 20 of book 30 is separated by a lamination plate 40 that may include a specific finish (e.g., matte or glossy). While four books are shown, 10 or more books is possible. On either side of book 30 is a lamination pad 50 to distribute pressure equally during lamination. The cassette is completed and ready for lamination when a top plate 60 normally made of metal is installed on top of an upper lamination pad 50. The completed cassette may then be installed in a lamination device that applies heat and pressure to laminate each sandwich 20 together. After lamination, individual card bodies (as shown in FIG. 1) may be cut out of the laminated sandwich for further processing such as engraving 19, milling, or the like.

Cassettes are loaded with a specific size of sheet that corresponds to the number of ID-1 format cards that may be cut from the laminated sandwich of sheets (e.g., 24-up, 48-up, 72-up, 80-up, and so on). For larger sheets (e.g., 72-up and 80-up), the cassette can be easily loaded on a platform that may tilt more than 45 degrees but normally less than 90 degrees, which speeds up the loading process. But for smaller sheets (e.g., 24-up and 48-up), the loading process would need to be done horizontally in order to properly justify the layers to be laminated, which slows down the loading process and reduces efficiency. Thus, it would be advantageous to more quickly load smaller sheets onto the cassette for lamination using a vertically tilted orientation. Moreover, a lamination cassette is typically intended for a specific size of sheet to be laminated, and thus, changing the sheet size also requires changing the cassettes used in production. Accordingly, using a single cassette for multiple sheet sizes would reduce the work required to change the type of sheet being laminated, and thus, would provide flexibility and improve production efficiency.

Another issue is that when a smaller-size sheet is laminated, overall production of cards is reduced per lamination cassette. Thus, it would be desirable to improve overall production output of lamination when a smaller-sheet size is used.

SUMMARY OF THE INVENTION

According to aspects of the present disclosure, a lamination cassette includes a substrate having a vertical support surface for supporting a plurality of first sheets of the first size. The substrate also includes an adapter so that a loading template may be removably coupled to the substrate via the adapter. The loading template includes a coupling portion that engages the adapter to secure the loading template when the lamination cassette is inclined at an angle of at least 45 degrees for loading, as well as a first loading section for accommodating a plurality of second sheets of a second size smaller than the first size when loaded onto the substrate. The first loading section has a first edge configured to support a first side of the plurality of second sheets and a second edge configured to support a second side of the plurality of second sheets. The vertical support surface of the lamination cassette is configured to support the plurality of first sheets when the adapter is not coupled to the substrate. But the vertical support surface is configured to support the plurality of second sheets when the loading template is coupled to the substrate. In addition, the loading template may also include a second loading section for accommodating a plurality of third sheets of the second size when loaded onto the substrate for laminating two pluralities of same size sheets on a single cassette.

According to other aspects of the present disclosure, there is a method for loading a lamination cassette configured for laminating a first plurality of sheets of a first size using a second plurality of sheets of a second size smaller than the first size. The method includes providing a lamination cassette having a substrate having a vertical support surface configured to support the plurality of first sheets of the first size. The method also includes coupling an adapter to the substrate and coupling a loading template to the substrate via the adapter. The loading template has a coupling portion that engages the adapter to secure the loading template when the lamination cassette is inclined at an angle of at least 45 degrees for loading. The loading template includes a first loading section for accommodating the plurality of second sheets of the second size smaller than the first size. The first loading section has a first edge that supports a first side of the plurality of second sheets and a second edge that supports a second side of the plurality of second sheets. The plurality of second sheets is loaded into the first loading section such that a height of the loaded plurality of second sheets is greater than a height of the adapter. The loading template is removed from the adapter and a top plate is placed upon the loaded plurality of second sheets. The top plate receives a pressing force applied by a lamination device to the loaded plurality of second sheets during a lamination process. The vertical support surface of the lamination cassette is configured to support the plurality of first sheets when the adapter is not coupled to the substrate. But the vertical support surface is configured to support the plurality of second sheets when the loading template is coupled to the substrate. Furthermore, the method may also include loading a third plurality of sheets of the second size into a second loading section of the loading template for laminating two pluralities of same size sheets on a single cassette. In such a case, a height of the loaded third plurality of sheets is greater than the height of the adapter.

By providing a lamination cassette with an adapter, it will improve overall efficiency by permitting different size sheets to be laminated using the same cassette, as well as improve production output when using smaller-size sheets. Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 3 is a perspective view of a lamination cassette according to an embodiment of the invention.

DETAILED DESCRIPTION OF THE INVENTION

Lamination cassettes can be more quickly loaded when in an inclined position, which is typically more than 45 degrees but less than 90 degrees. As a result, lamination cassettes are often loaded on tilting loading platforms where larger sheets are loaded in an inclined, vertical orientation. While smaller sheets are loaded in a horizontal orientation so that the books may be aligned or justified properly. Moreover, lamination cassette are intended for a specific size sheet so changing the sheets size may require 30 or more lamination cassettes to be swapped out, which slows down production. Finally, smaller sheets use a smaller cassette, which reduces the overall production output of laminated sheets. Loading multiple books of smaller-size sheets on a larger-size lamination cassette would improve production output.

Figure 1:
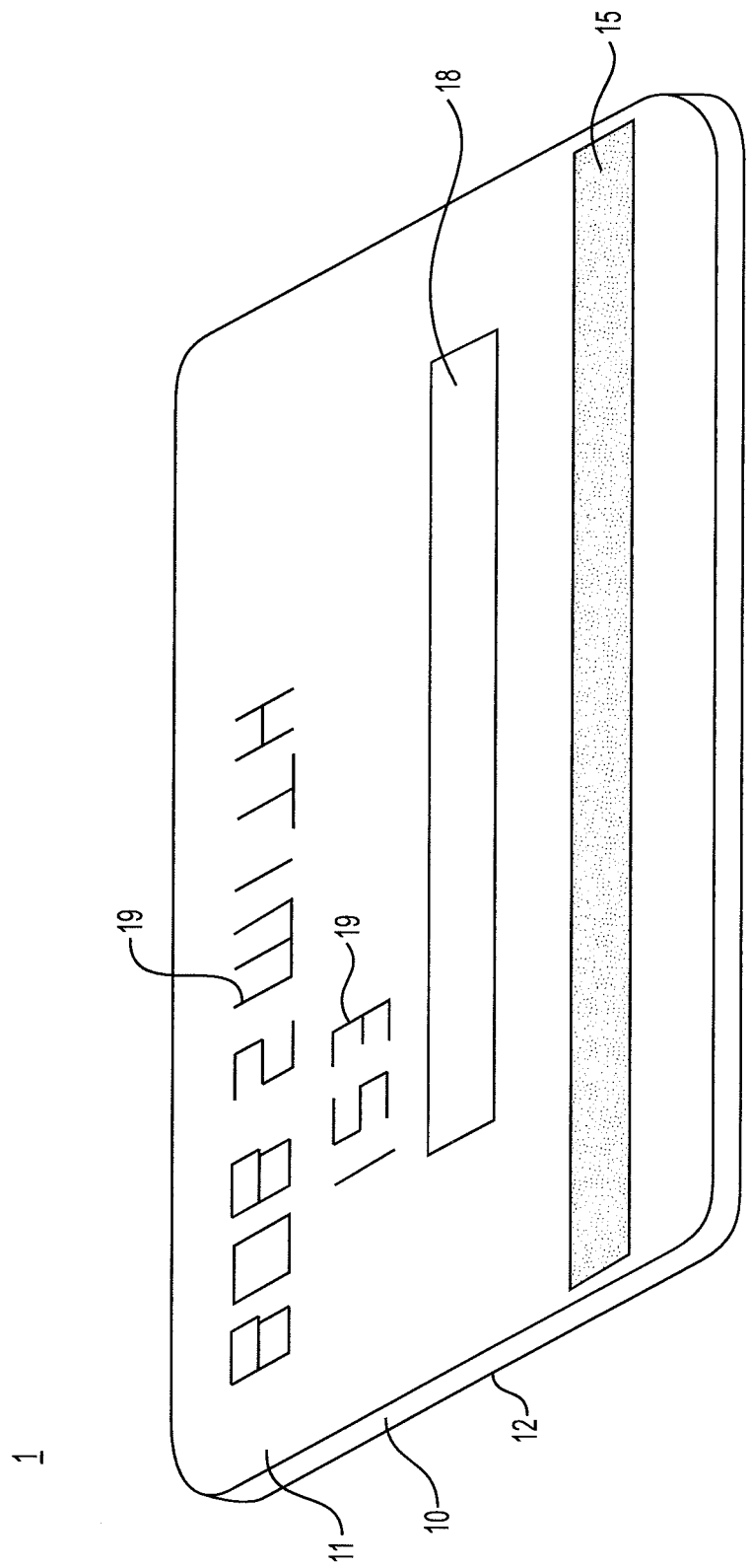
FIG. 1 is a perspective view showing a conventional ID-1 format card.
Figure 2:
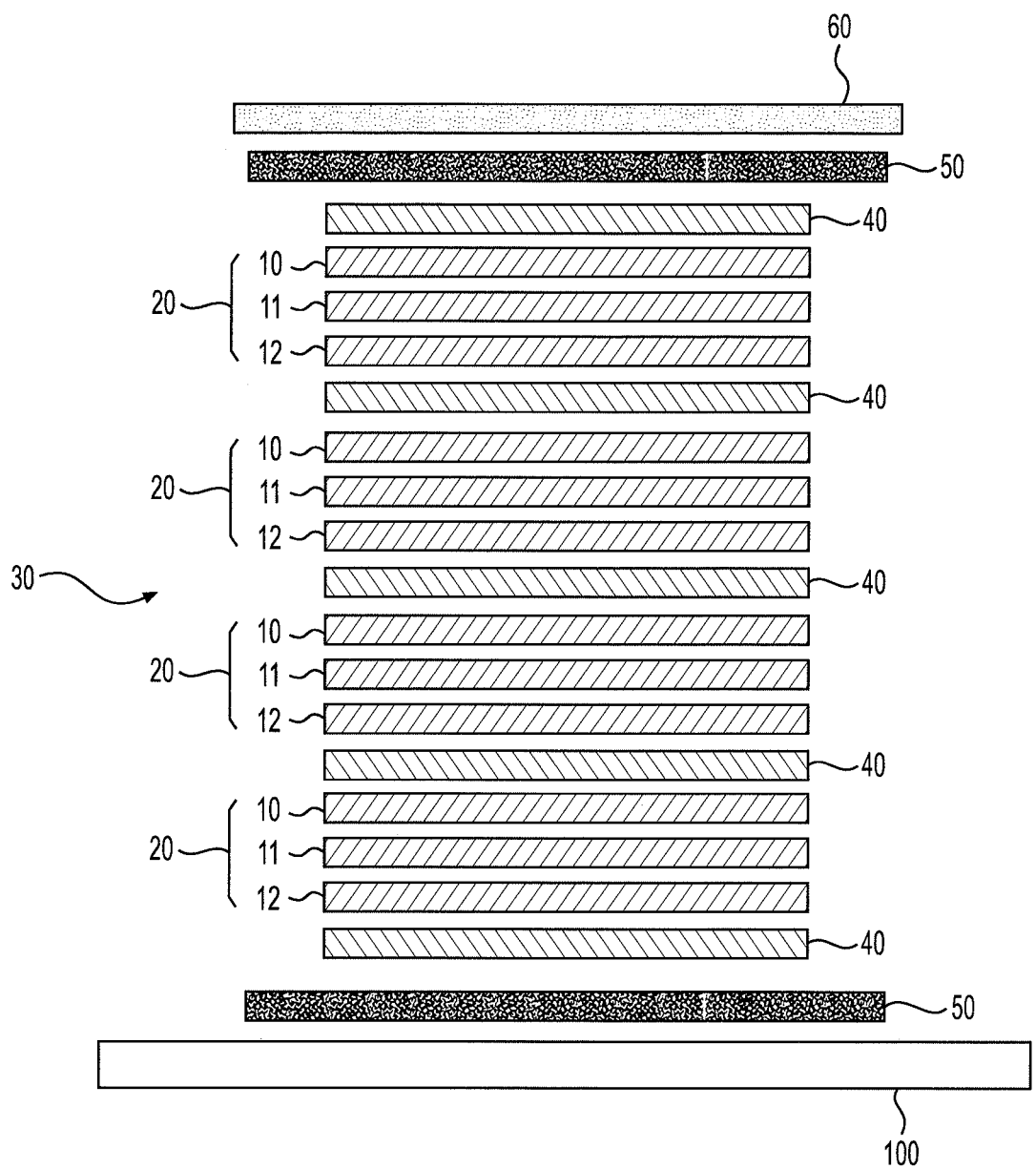
FIG. 2 is an elevational view of a lamination cassette loaded with a book comprising layers of material to be laminated.
Figure 4A:
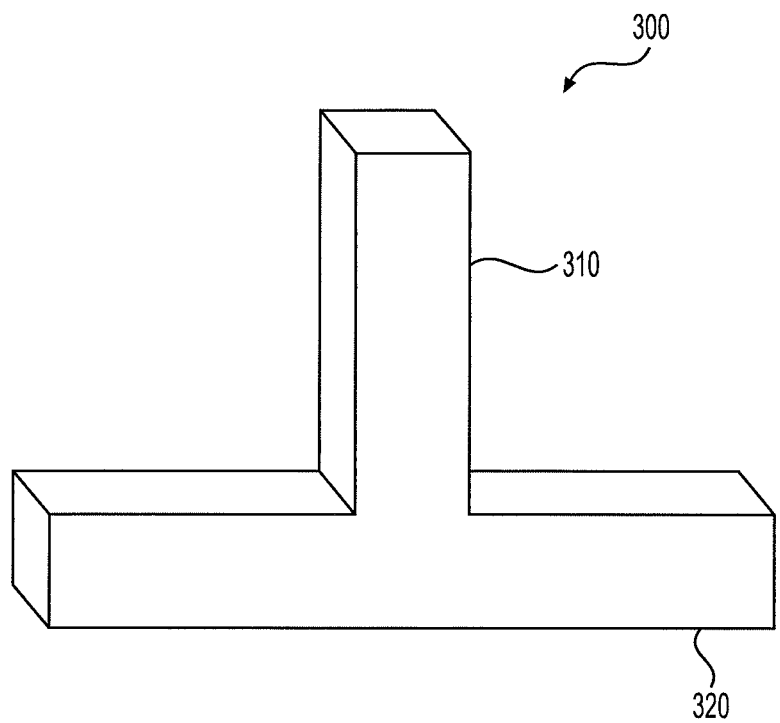
FIGS. 4A and 4B are plan views of a loading template according to an embodiment of the invention.
Figure 4B:
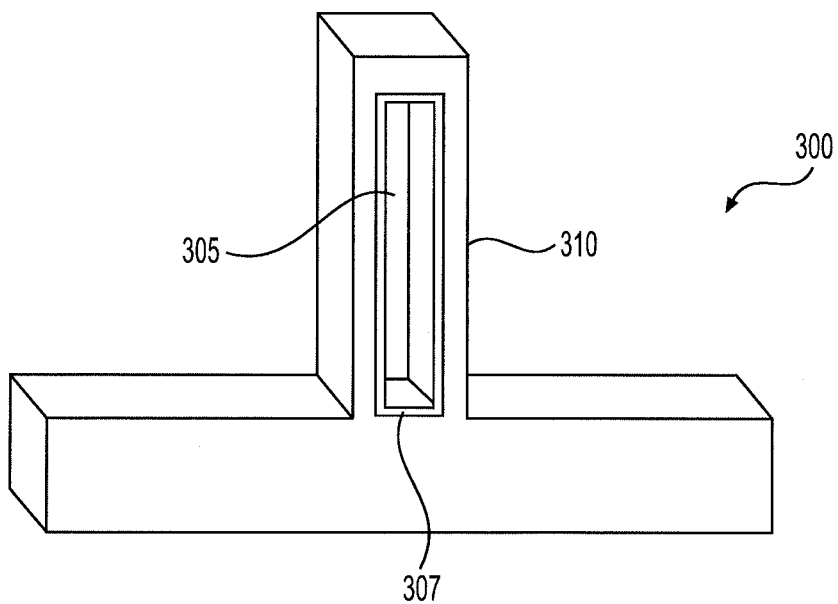

FIG. 3 shows a lamination cassette 200 having a substrate defining a vertical support surface for supporting 72-up size sheets on a loading platform 230 that is inclined slightly less than perpendicular (i.e., 90 degrees). Platform 230 may also include support bars 210 for aligning a plurality of sheets (i.e., a book of sheets to be laminated) loaded onto cassette 200. According to an exemplary embodiment, cassette may also include an adapter 240 for engaging a loading template that will be described below. Adapter 240 may be connected to lamination cassette by any suitable fastening mechanism but a quick release bolt or pin that permits quick removal of adapter 240 may be preferable. FIG. 3 shows adapter 240 extending in a longitudinal direction corresponding to the height of the inclined lamination cassette 230, but adapter 240 may also be in any suitable orientation such as extending in a widthwise direction of the inclined lamination cassette 230. In addition, adapter 240 may also have one or more flanges (e.g., have an I-shape) to provide further stability FIG. 4A shows a plan view of an upper side of a loading template 300 according to an exemplary embodiment of the invention. Loading template 300 includes an edge portion 310 that defines an edge against which book loaded into the template in an inclined position may be justified. Loading template 300 also includes a separation portion 320 that separate loading sections in which smaller-size books may be loaded onto cassette 200. FIG. 4B shows a plan view of a lower side of lading template 300. Loading template 300 includes a cavity 305 defined in separation portion 320 that may be configured as a coupling portion to removably engage adapter 240 so that that loading template 300 is secured to lamination cassette 200 when inclined for loading. Any coupling mechanism is suitable by cavity 305 may also include a resilient member 307 to provide an improved press fit between coupling portion 305 and adapter 240. Moreover, coupling portion 305 may be formed in edge portion 310 of loading template, the position depending on the desired location of template 300 on cassette 200. One such example is if the adapter extended in a widthwise direction that is generally perpendicular to adapter 240 shown in FIG. 3, then coupling portion 305 may be defined along the length of edge portion 310 generally perpendicular to separation portion 310.

Figure 5A:
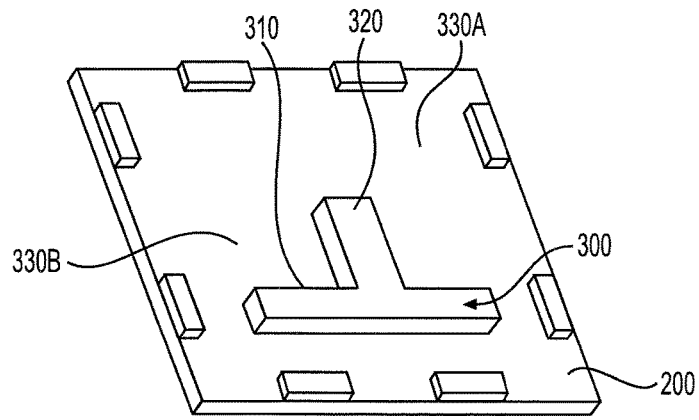
FIGS. 5A and 5B are perspective views of the lamination cassette of FIG. 3 coupled to the loading template of FIGS. 4A and 4B, with and without books loaded thereon, according to an embodiment of the invention.
Figure 5B:
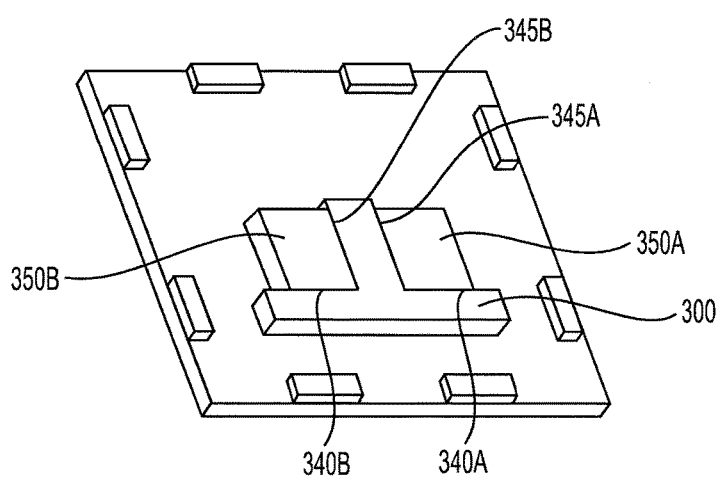

FIG. 5A shows loading template 300 coupled to lamination cassette 200 according to an exemplary embodiment of the invention. Template 300 defines two loading sections 330A, 330B that are suitable for a smaller size book that the 72-up size, such as 24-up size for example. FIG. 5B shows a 24-up size book 350A, 350B loaded into each of loading sections 330A, 330B. When loaded in an inclined position, each book may 350A, 350B be justified by a corresponding edge 340A, 340B of edge portion 310 and another corresponding edge 345A, 345B defined by separation portion 320 that separates loading sections 330A, 330B. The height of each loaded book 350A, 350A is substantially the same for a consistent lamination process.

Figure 6:
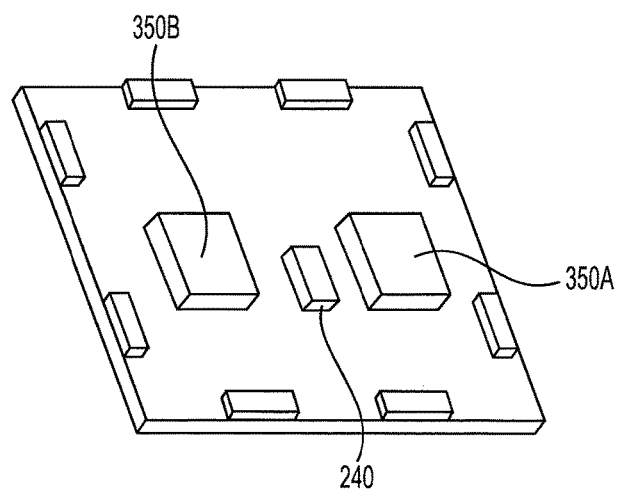
FIG. 6 is a perspective view of the lamination cassette of FIG. 5B after the loading template is removed.
Figure 7A:
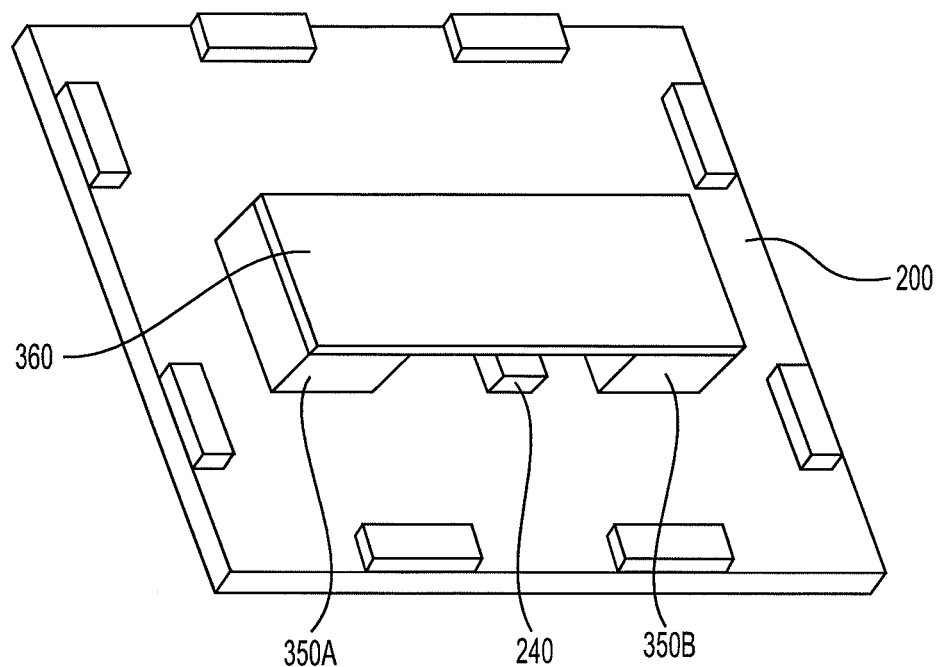
FIGS. 7A and 7B are perspective views of the lamination cassette of FIG. 6 with top plate configurations installed for loading the cassette into a lamination device according to embodiments of the invention.

FIG. 6 shows books 350A, 350B after loading template 300 is removed when cassette is a substantially horizontal position ready for loading into a lamination device. Loading template 300 may be removed prior to lamination because the template is generally at least the same height as books to provide justification of loaded books 350A, 350B. Nevertheless, Books 350A, 350B are taller than adapter 240 so that it may remain coupled to lamination cassette 200 during a lamination process. FIG. 7A shows a top plate 360, which may be made of metal, which is placed upon books 350A, 350B for receiving the pressing force of the lamination device. Laminating pressure may be provided by a pressure ram such as the lamination process provided by a Bürkle SMARTLAM Lamination System with multiple daylights for lamination cassettes. Loaded cassettes may be used with other lamination devices as well.

Figure 7B:
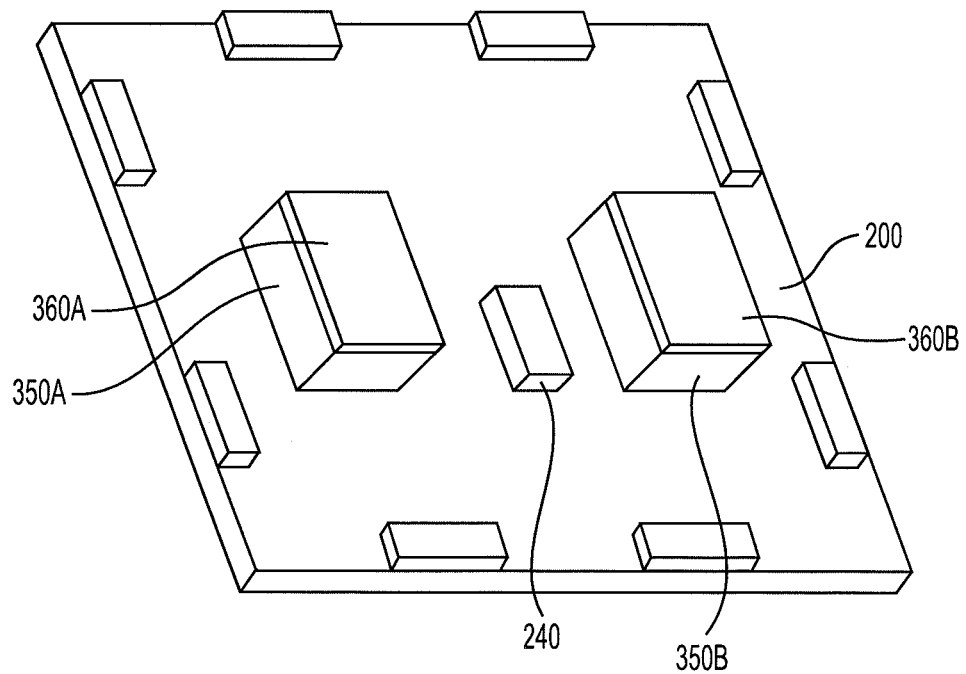

FIG. 7B shows a pair of smaller top plates 360A, 360B according to an exemplary embodiment of the invention that are sized corresponding to the smaller 24-up size books. This configuration may speed the loading process because books 350A, 350B may be loaded into template 300 with corresponding top plates 360A, 360B already thereon. As a template 300 may be removed prior to lamination without interfering with top plates 360A, 360B and extra loading step may be reduced.

Lamination cassette 200 loaded with books 350A, 350B, having at least one top plate covering such books, may be inserted into a lamination device for lamination. According to an exemplary embodiment of the invention, loading template 300 not only permits the use of a larger size lamination cassette for smaller size books, but also doubles laminate production by taking advantage of the extra space of 72-up lamination cassette 200.

Figure 8:
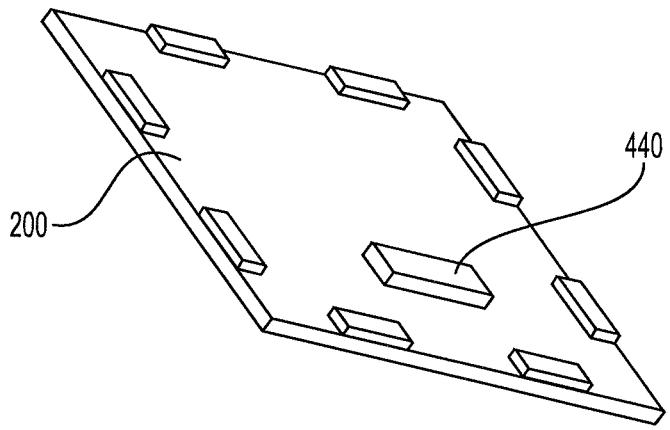
FIG. 8 is a perspective view of a lamination cassette according to an alternative embodiment of the invention.
Figure 9:
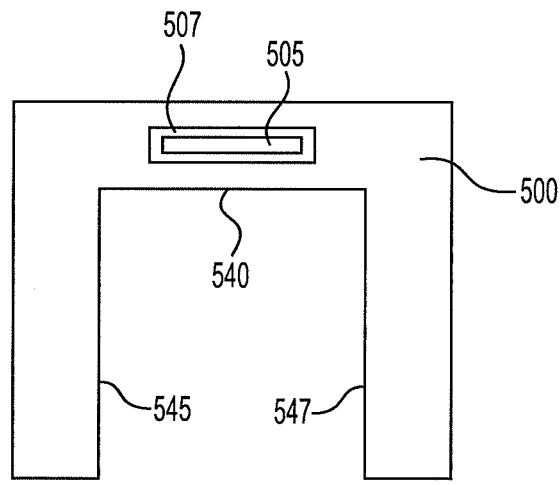
FIG. 9 is a plan view of a loading template according to an alternative embodiment of the invention.

FIG. 8 shows lamination cassette 200 with an adapter 440 according an exemplary embodiment of the invention. Here, adapter 440 is generally perpendicular to the arrangement of adapter 240 as shown in FIG. 3. FIG. 9 shows a loading template 500 according an exemplary embodiment of the invention that includes a loading section for a single smaller-size book (e.g., 48-up) on a size 72-up cassette such as lamination cassette 200. Like lamination cassette 300, lamination cassette 500 includes a cavity 505 that defines a coupling portion configured to engage adapter 440. Further, a press fit between adapter 440 and coupling portion 505 may be augmented by use of a resilient member 507.

Figure 10:
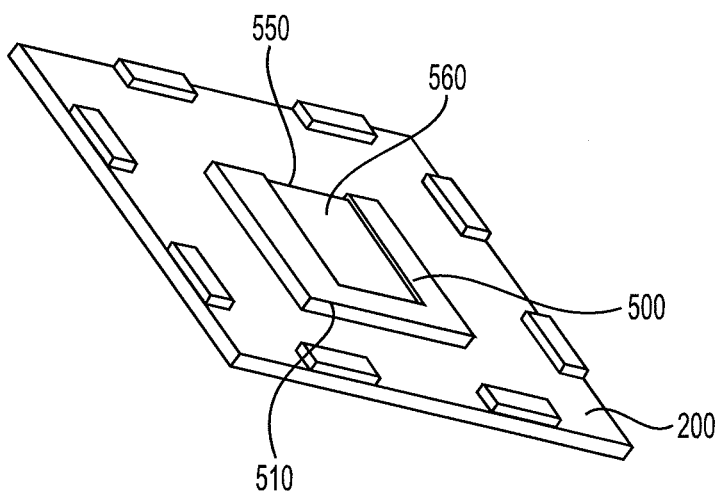
FIG. 10 is a perspective view of the loading template of FIG. 9 coupled to the lamination cassette of FIG. 8 according to an alternative embodiment of the invention.

FIG. 10 shows a 48-up size book 550 loaded into template 500 according an exemplary embodiment of the invention. Template 500 include edge 540 defined by edge portion 510 that justifies and supports book 550 when lamination cassette 200 is an inclined position. Further alignment or justification of book 550 may be provided edge 545, 547 in a U-shaped loading template. Alternatively, one or both of edges 545, 547 may be omitted. Book 550 may be loaded with top plate 560 of a corresponding size already placed thereon to improve loading efficiency as top plate 560 will not interfere with removal of loading template prior to lamination. Again, book 550 may be taller than adapter 440 so that it may remain coupled to lamination cassette 200 during the lamination process. Accordingly, use of different template configuration may permit a number different size sheets to be laminated on a single lamination cassette 200.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, while the disclosed embodiments illustrate certain sizes of sheets to be laminated and cassette sizes, the invention can be modified as appropriate to accommodate a smaller sheet size on a larger lamination cassette or otherwise maximize productivity of a lamination device with smaller sheet sizes. Moreover, the invention applies to any lamination not just ID-1 format cards. In addition, lamination cassette may have multiple fastening mechanisms to maximize the number of compatible sheet sizes by permitting the use different adapters and loading templates. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A lamination cassette, comprising:
a substrate comprising a vertical support surface configured to support a plurality of first sheets of a first size;
an adapter coupled to the substrate; and
a loading template configured to be removably coupled to the substrate via the adapter, the loading template comprising:
a coupling portion configured to engage the adapter to secure the loading template when the lamination cassette is inclined at an angle of at least 45 degrees; and
a first loading section configured to accommodate a plurality of second sheets of a second size smaller than the first size when loaded onto the substrate, the first loading section comprising a first edge configured to support a first side of the plurality of second sheets and a second edge configured to support a second side of the plurality of second sheets,
wherein the vertical support surface is configured to support the plurality of first sheets when the adapter is not coupled to the substrate and the vertical support surface is configured to support the plurality of second sheets when the loading template is coupled to the substrate.

2. The lamination cassette of claim 1, wherein the loading template comprises a second loading section configured to accommodate a plurality of third sheets of the second size when loaded onto the substrate, and
wherein the second loading section comprises a first edge configured to support a first side of the plurality of third sheets and a second edge configured to support a second side of the plurality of third sheets,
wherein the vertical support surface is configured to support the plurality of second sheets and the plurality of third sheets when the loading template is coupled to the substrate.

3. The lamination cassette of claim 2, wherein the coupling portion is configured to engage the adapter via a press fit.

4. The lamination cassette of claim 3, wherein the press fit is provided by a resilient member provided on one of the adapter or the coupling portion.

5. The lamination cassette of claim 2, further comprising at least one top plate configured to be placed upon the respective pluralities of second and third sheets when loaded into the loading template and onto the substrate,
wherein the at least one top plate is configured to receive a pressing force applied by a lamination device to the pluralities of second and third sheets accommodated by the loading template during a lamination process.

6. The lamination cassette of claim 5, further comprising lamination pads disposed on opposite ends of the pluralities of second and third sheets adjacent the substrate and at least one template, the lamination pads configured to distribute pressure equally during the lamination process.

7. The lamination cassette of claim 6, wherein the loading template is configured to be decoupled from the adapter via the coupling portion prior to placing the at least one top plate upon the respective pluralities of second and third sheets.

8. The lamination cassette of claim 5, wherein a height of the adapter is less than a corresponding height of the second plurality of sheets when loaded into the loading template.

9. The lamination cassette of claim 8, wherein the height of the second plurality of sheets when loaded into the loading template is the same as a height of the third plurality of sheets when loaded into the loading template.

10. The lamination cassette of claim 5, wherein the at least one top plates corresponds to a pair of top plates, and
wherein each top plate of the pair of top plates is configured to be placed upon one of the respective pluralities of second and third sheets when loaded into the loading template and onto the substrate.

11. The lamination cassette of claim 10, wherein the loading template is configured to be decoupled from the adapter via the coupling portion prior to placing the pair of top plates upon the corresponding pluralities of second and third sheets.

12. The lamination cassette of claim 11, wherein a height of the adapter is less than a corresponding height of the second plurality of sheets.

13. The lamination cassette of claim 2, wherein the loading template further comprises:
a first edge portion that extends along a first direction and defines the first edge of each of the first loading section and the second loading section; and
a separation portion that extends from the first edge portion along a second direction substantially orthogonal to the first direction, the separation portion defines the second edge of each of the first loading section and the second loading section such that the separation portion is disposed between the first loading section and the second loading section.

14. The lamination cassette of claim 13, wherein the coupling portion is disposed within an under side of the first edge portion.

15. The lamination cassette of claim 13, wherein the coupling portion is disposed within an under side of the separation portion.

16. The lamination cassette of claim 1, wherein the first loading section further comprises a third edge configured to support a third side of the plurality of second sheets,
wherein the first edge is defined by a first edge portion connecting the first edge to the second edge and the third edge,
wherein the coupling portion is disposed within an under side of the first edge portion, and
wherein the third edge is substantially parallel to the second edge and substantially orthogonal to the first edge.

17. A method of loading a lamination cassette configured for laminating a first plurality of sheets of a first size using a second plurality of sheets of a second size smaller than the first size, the method comprising:
providing a lamination cassette that comprises a substrate including a vertical support surface configured to support a plurality of first sheets of the first size;
coupling an adapter to the substrate;
coupling a loading template to the substrate via the adapter, the loading template comprising:
a coupling portion configured to engage the adapter to secure the loading template when the lamination cassette is inclined at an angle of at least 45 degrees; and
a first loading section configured to accommodate a plurality of second sheets of the second size smaller than the first size, the first loading section comprising a first edge configured to support a first side of the plurality of loaded second sheets and a second edge configured to support a second side of the loaded plurality of second sheets;
loading the plurality of second sheets into the first loading section such that a height of the loaded plurality of second sheets is greater than a height of the adapter;
removing the loading template from the adapter; and
placing a top plate upon the plurality of second sheets, the top plate is configured to receive a pressing force applied by a lamination device to the loaded plurality of second sheets during a lamination process,
wherein the vertical support surface is configured to support the plurality of first sheets when the adapter is not coupled to the substrate and the vertical support surface is configured to support the plurality of second sheets when the loading template is coupled to the substrate.

18. The method of loading a lamination cassette of claim 17, further comprising loading a third plurality of sheets of the second size into a second loading section of the loading template such that a height of the loaded third plurality of sheets is greater than the height of the adapter,
wherein the second loading section comprises a first edge configured to support a first side of the loaded plurality of third sheets and a second edge configured to support a second side of the loaded plurality of third sheets,
wherein the vertical support surface is configured to support the plurality of second sheets and the plurality of third sheets when the loading template is coupled to the substrate.

19. The method of loading a lamination cassette of claim 18, wherein the height of the loaded second plurality of sheets is the same as the height of the loaded third plurality of sheets.

20. The method of loading a lamination cassette of claim 18, wherein the step of placing a top plate upon the loaded plurality of second sheet comprises placing at least one top plate upon the plurality of second sheets and the plurality of third sheets.

21. The method of loading a lamination cassette of claim 20, wherein the at least one top plates comprises a pair of top plates, and
wherein each top plate of the pair of top plates is configured to be placed upon one of the respective pluralities of second and third sheets.

22. The method of loading a lamination cassette of claim 21, wherein each top plate of the pair of top plates is placed upon one of the respective loaded pluralities of second and third sheets before the respective pluralities of second and third sheets are loaded into the corresponding first and second loading sections.

23. The method of loading a lamination cassette of claim 20, wherein the steps of loading the second plurality of sheets and loading the third plurality of sheets comprises loading an upper lamination pad adjacent to the substrate and an upper lamination pad onto top of the respective one of the pluralities of second and third sheets, the upper and lower lamination pads configured to distribute pressure equally during the lamination process.

\* \* \* \* \*